United States Patent
Rozen et al.

(10) Patent No.: US 12,505,095 B1
(45) Date of Patent: Dec. 23, 2025

(54) METHOD AND SYSTEM FOR CONSTRUCTING VECTOR DATABASES USED FOR CONVERTING FREE TEXT QUERIES TO CYBER LANGUAGE QUERIES

(71) Applicant: Vega Cyber Solutions LTD, Tel Aviv-Jaffa (IL)

(72) Inventors: Eli Rozen, Tel Aviv (IL); Gil Knafo, Tel Aviv (IL); Yarden Sasson, Ramat Gan (IL)

(73) Assignee: Vega Cyber Solutions LTD, Tel Aviv-Jaffa (IL)

( * ) Notice: Subject to any disclaimer, the term of this patent is extended or adjusted under 35 U.S.C. 154(b) by 0 days.

(21) Appl. No.: 19/255,270

(22) Filed: Jun. 30, 2025

Related U.S. Application Data

(60) Provisional application No. 63/770,086, filed on Mar. 11, 2025.

(51) Int. Cl.
| | |
|---|---|
| *G06F 16/242* | (2019.01) |
| *G06F 16/21* | (2019.01) |
| *G06F 16/2452* | (2019.01) |
| *H04L 9/40* | (2022.01) |

(52) U.S. Cl.
CPC ........ *G06F 16/2433* (2019.01); *G06F 16/213* (2019.01); *G06F 16/24522* (2019.01); *H04L 63/1425* (2013.01)

(58) Field of Classification Search
CPC ........... G06F 16/2433; G06F 16/24522; G06F 16/213; H04L 63/1425
See application file for complete search history.

(56) References Cited

U.S. PATENT DOCUMENTS

| | | | |
|---|---|---|---|
| 9,680,779 B2* | 6/2017 | Marovets | H04L 51/08 |
| 11,736,526 B2* | 8/2023 | Jeong | H04L 63/205 |
| | | | 726/1 |
| 11,954,102 B1 | 4/2024 | Palaniappan et al. | |
| 2020/0120102 A1* | 4/2020 | Cybulski | H04L 63/101 |

(Continued)

OTHER PUBLICATIONS 2025 3rd International Conference on Self Sustainable Artificial Intelligence Systems (ICSSAS) Year: 2025 | Conference Paper | Publisher: IEEENarang et al., "Project Pulse: A Scalable, Secure, and Smart Project Management Platform on AWS,".*

(Continued)

*Primary Examiner* — Roderick Tolentino
(74) *Attorney, Agent, or Firm* — M&B IP Analysts, LLC

(57) ABSTRACT

A system and method for querying data sources for cyber-security analysis is presented. The system and method include: receiving security logs from at least one data source, wherein the security logs lack pre-defined schema; generating a schema of the security logs based on at least a type of data of the security logs, wherein the generated schema includes fields of the security logs and values of the fields; embedding field vectors, wherein each field vector is a vector representation of a value of each respective field; embedding value vectors, wherein each value vector is a vector representation of a natural language description of each value in each respective field; and generating a query in a cyber language query, using an AI system, for execution on at least one target data source based, in part, on the generated schema, the embedded field vectors, and the embedded value vectors.

21 Claims, 5 Drawing Sheets

(56) References Cited

U.S. PATENT DOCUMENTS

| | | |
|---|---|---|
| 2022/0035775 A1* | 2/2022 | Sriharsha ............ G06F 18/2115 |
| 2023/0291743 A1* | 9/2023 | Shua .................... H04L 63/102 |
| 2024/0070270 A1 | 2/2024 | Mace et al. |
| 2024/0259435 A1* | 8/2024 | Giralte .................... H04L 63/20 |
| 2024/0265913 A1* | 8/2024 | Laptev .................... G10L 15/16 |
| 2024/0364712 A1* | 10/2024 | Chandana ........... H04L 63/1433 |
| 2024/0419803 A1 | 12/2024 | Blum et al. |
| 2025/0028746 A1 | 1/2025 | Cantu et al. |
| 2025/0086308 A1 | 3/2025 | Crume et al. |
| 2025/0156384 A1* | 5/2025 | Rajagopalan ........... H04L 51/02 |
| 2025/0217346 A1* | 7/2025 | Black .................. H04L 63/1425 |
| 2025/0245446 A1 | 7/2025 | Ayed et al. |
| 2025/0247400 A1* | 7/2025 | Verma ................. H04L 63/1416 |

OTHER PUBLICATIONS

Ji et al., "Leveraging Large Language Model for Intelligent Log Processing and Autonomous Debugging in Cloud AI Platforms," 2025 8th International Conference on Advanced Electronic Materials, Computers and Software Engineering (AEMCSE) Year: 2025 | Conference Paper | Publisher: IEEE.*

Tang, X., Abdi, A. H., Eichelbaum, J., Das, M., Klein, A., Pakis, N. I., Blum, W., Mace, D. L., Raja, T., Padmanabhan, N., & Xing, Y. (2024). NL2KQL: From natural language to kusto query. In arXiv [cs.DB]. http://arxiv.org/abs/2404.02933.

J. Yi, G. Chen and Z. Shen, "RH-SQL: Refined Schema and Hardness Prompt for Text-to-SQL,", 2024, 2024 6th International Conference on Electronic Engineering and Informatics (EEi), Chongqing, China, pp. 1340-1343 (Year: 2024).

* cited by examiner

400

S410
Retrieve security logs from at least one data source

S420
Generate schema of the security logs

S430
Embed field vectors

S440
Embed value vectors

S450
Generate a cyber language query for execution on at least one target data source

Fig. 4

METHOD AND SYSTEM FOR CONSTRUCTING VECTOR DATABASES USED FOR CONVERTING FREE TEXT QUERIES TO CYBER LANGUAGE QUERIES

CROSS-REFERENCE TO RELATED APPLICATIONS

This application claims the benefit of U.S. Provisional Application No. 63/770,086 filed on Mar. 11, 2025, the contents of which are hereby incorporated by reference.

TECHNICAL FIELD

The present disclosure relates generally to methods for constructing databases for converting natural language queries to cyber language queries.

BACKGROUND

Cyber languages, including Kusto Query Language (KQL), are powerful query languages used in cybersecurity platforms for searching, analyzing, and visualizing log data. Many security analysts struggle with syntax of various cyber language queries, leading to inefficiencies in data exploration. As such, writing such queries to analyze security logs can be challenging, especially for non-technical users or those unfamiliar with the language syntax.

For example, for analysts lacking expertise in KQL, manually constructing queries is a time-intensive process. A Natural Language to KQL (NL2KQL) translation system may offer a solution by enabling users to query data with ease. However, existing solutions, including those leveraging standard large language models (LLMs), are inefficient due to inaccuracies arising from the inherent ambiguity of natural language. Additionally, these methods are resource-intensive, leading to increased processing time and computational overhead.

Another challenge in translating natural language to KQL is ensuring that the generated KQL is syntactically correct for execution within a KQL-based search engine. Additionally, the generated KQL query must not only be syntactically valid but also contextually relevant to the underlying log data, thereby facilitating meaningful and effective query generation.

A significant technical challenge arises from the inherently unstructured nature of logs, which often lack a pre-defined schema. In many cases, fields are not explicitly defined, nor are the fields' data types or potential values known in advance. This lack of structure complicates query generation and interpretation.

In real-world scenarios, certain data sources can be highly complex. For example, AWS CloudTrail® contains over one thousand unique fields, adding to the difficulty of effective log parsing and analysis. Moreover, some fields may have an unbounded number of possible values, further exacerbating the challenge of extracting meaningful insights in a scalable and efficient manner.

Additionally, existing NL2KQL tools are only operable on particular Kusto databases (e.g., databases associated with Microsoft Sentinel® and Microsoft Defender®) that contain a limited variety of data schema and do not provide an operable solution for generating, from natural language request, KQL queries that are performant on a wide variety of Kusto databases.

It would, therefore, be advantageous to provide a solution that will overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include: receiving, by a device, security logs from at least one data source, where the security logs lack pre-defined schema; generating, using an AI embedding system, a schema of the security logs based on at least a type of data of the security logs, where the generated schema includes fields of the security logs and values of the fields; embedding, using the AI embedding system, field vectors, where each field vector is a vector representation of a value of each respective field; embedding, using the AI embedding system, value vectors, where each value vector is a vector representation of a natural language description of each value in each respective field; and generating a query in a cyber language query, using an AI system, for execution on at least one target data source based, in part, on the generated schema, the embedded field vectors, and the embedded value vectors. Other embodiments of this aspect include corresponding computer systems, apparatus, and computer programs recorded on one or more computer storage devices, each configured to perform the actions of the methods.

Implementations may include one or more of the following features. The method may include: generating pairs of NLQs and cyber language queries, where the pairs are potentially valid matches between NLQs and the cyber language queries; validating that the generated cyber language queries are properly matched to the generated NLQs; and embedding vectors of each of the pairs. The method is provided where generating the cyber language query, using an AI system, for execution on at least one target data source based on the generated schema, the embedded field vectors, and the embedded value vectors may include: identifying fields that are relevant to a natural language query (NLQ) based on a field vector similarity search using the embedded field vectors; computing values for the identified fields based on actual values that are relevant to the identified fields and the NLQ based on a value vector similarity search using the embedded value vectors; refining the generated schema based on the identified fields and the computed values; generating, based on at least the refined schema, a prompt for a Large Language Model (LLM), where the LLM is executed by an AI-based query generation system; and feeding the prompt to the LLM, where the LLM executes the prompt using the AI-based query generation system, to convert the NLQ into the cyber language query. The method is provided where the field vector similarity search may include: comparing, using a semantic distance metric, a feature vector representing the NLQ and each embedded field vector; identifying at least one field for which the embedded field vector is below a semantic distance threshold from the feature vector representing the NLQ; and validating the identified at least one field against ground-truth pairs of natural language field descriptions and fields searchable in the cyber language for at least one target data source. The method is provided where the value vector similarity search included in the method may include: comparing, using a semantic distance metric, a feature vector representing the NLQ and each embedded value vector; identifying at least one value for which the embedded value vector is below a semantic distance threshold from the value vector representing the NLQ; and validating the at least one value against ground-truth pairs of natural language value descriptions and actual values in the at least one target data source. The method is provided where refining the schema of the logs based on the identified fields and computed values may include: narrowing the schema to the most pertinent elements of the schema based on the identified fields and computed values. The method may include: generating, using the AI embedding system, the natural language descriptions of the received fields, where the AI embedding system is configured to gather relevant information on the fields from official documentation and other available data sources to generate the natural language descriptions. The method may include: validating syntactical correctness of the generated cyber language query. The method is provided where the cyber language query is a read-only request to process data stored hierarchically in databases, tables, and columns. The method is provided where the cyber language is at least Kusto Query Language. Implementations of the described techniques may include hardware, a method or process, or a computer tangible medium.

In one general aspect, a non-transitory computer-readable medium may include one or more instructions that, when executed by one or more processors of a device, cause the device to: receive, by a device, security logs from at least one data source, where the security logs lack pre-defined schema; generate, using an AI embedding system, a schema of the security logs based on at least a type of data of the security logs, where the generated schema includes fields of the security logs and values of the fields; embed, using the AI embedding system, field vectors, where each field vector is a vector representation of a value of each respective field; embed, using the AI embedding system, value vectors, where each value vector is a vector representation of a natural language description of each value in each respective field; and generate a query in a cyber language query, using an AI system, for execution on at least one target data source based, in part, on the generated schema, the embedded field vectors, and the embedded value vectors. Other embodiments of this aspect include corresponding computer systems, apparatus, and computer programs recorded on one or more computer storage devices, each configured to perform the actions of the methods.

In one general aspect, a system may include one or more processors configured to: receive, by a device, security logs from at least one data source, where the security logs lack pre-defined schema; generate, using an AI embedding system, a schema of the security logs based on at least a type of data of the security logs, where the generated schema includes fields of the security logs and values of the fields; embed, using the AI embedding system, field vectors, where each field vector is a vector representation of a value of each respective field; embed, using the AI embedding system, value vectors, where each value vector is a vector representation of a natural language description of each value in each respective field; and generate a query in a cyber language query, using an AI system, for execution on at least one target data source based, in part, on the generated schema, the embedded field vectors, and the embedded value vectors. Other embodiments of this aspect include corresponding computer systems, apparatus, and computer programs recorded on one or more computer storage devices, each configured to perform the actions of the methods.

Implementations may include one or more of the following features. The system may include: generating pairs of NLQs and cyber language queries, where the pairs are potentially valid matches between NLQs and the cyber language queries; validating that the generated cyber language queries are properly matched to the generated NLQs; and embedding vectors of each of the pairs. The system is provided where generating the cyber language query, using an AI system, for execution on at least one target data source based on the generated schema, the embedded field vectors, and the embedded value vectors may include: identifying fields that are relevant to a natural language query (NLQ) based on a field vector similarity search using the embedded field vectors; computing values for the identified fields based on actual values that are relevant to the identified fields and the NLQ based on a value vector similarity search using the embedded value vectors; refining the generated schema based on the identified fields and the computed values; generating, based on at least the refined schema, a prompt for a Large Language Model (LLM), where the LLM is executed by an AI-based query generation system; and feeding the prompt to the LLM, where the LLM executes the prompt using the AI-based query generation system, to convert the NLQ into the cyber language query. The system is provided where the field vector similarity search may include: comparing, using a semantic distance metric, a feature vector representing the NLQ and each embedded field vector; identifying at least one field for which the embedded field vector is below a semantic distance threshold from the feature vector representing the NLQ; and validating the identified at least one field against ground-truth pairs of natural language field descriptions and fields searchable in the cyber language for at least one target data source. The system is provided where the value vector similarity search may include: comparing, using a semantic distance metric, a feature vector representing the NLQ and each embedded value vector; identifying at least one value for which the embedded value vector is below a semantic distance threshold from the value vector representing the NLQ; and validating the at least one value against ground-truth pairs of natural language value descriptions and actual values in the at least one target data source. The system is provided where refining the schema of the logs based on the identified fields and computed values may include: narrowing the schema to the most pertinent elements of the schema based on the identified fields and computed values. The system may include: generating, using the AI embedding system, the natural language descriptions of the received fields, where the AI embedding system is configured to gather relevant information on the fields from official documentation and other available data sources to generate the natural language descriptions. The system may include: validating syntactical correctness of the generated cyber language query. The system is provided where the cyber language query is a read-only request to process data stored hierarchically in databases, tables, and columns. The system is provided where the cyber language is at least Kusto Query Language. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is an example flowchart of a process for querying data sources for cybersecurity analysis according to an embodiment.

DETAILED DESCRIPTION

Figure 1:
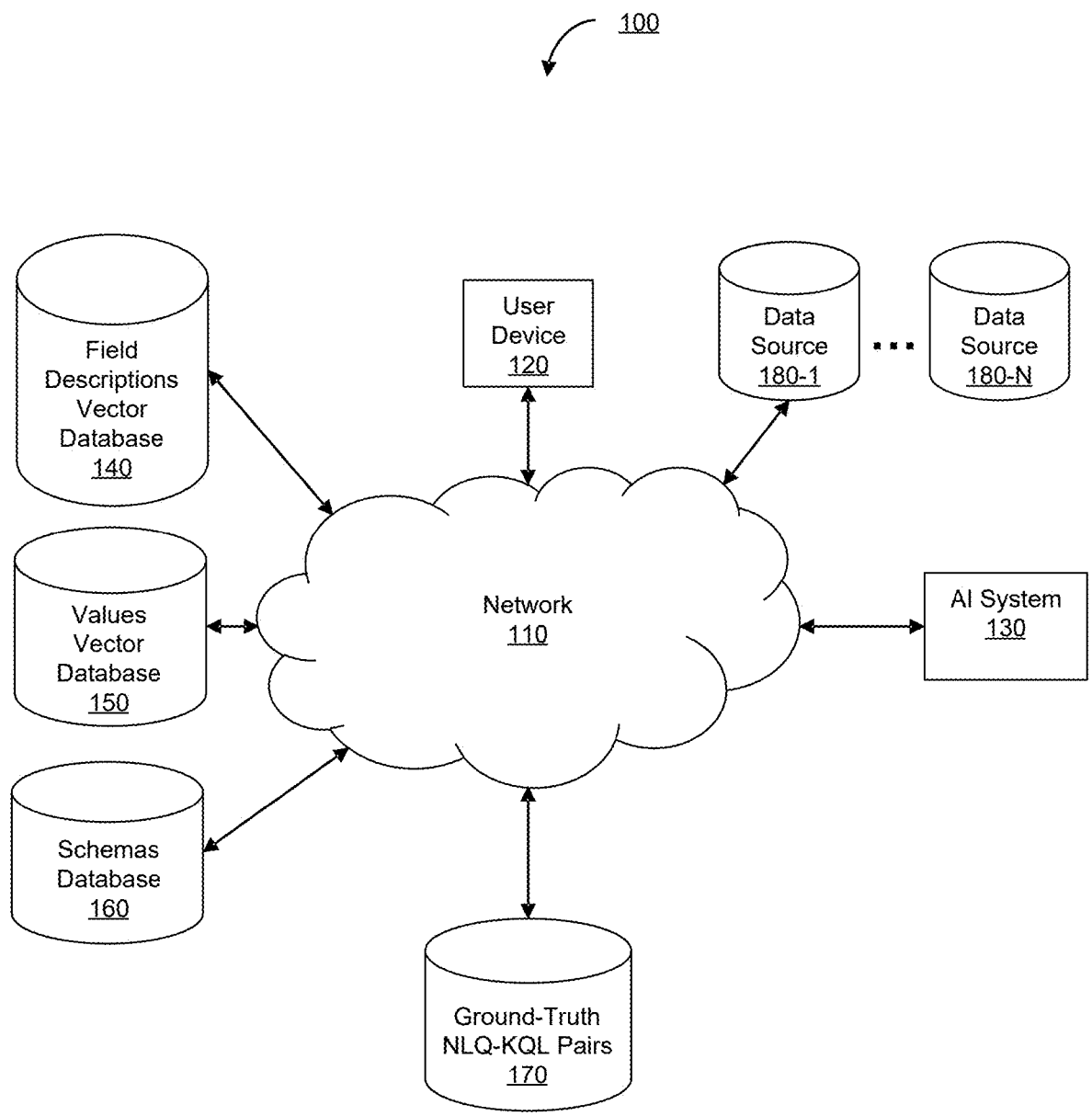
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments provide a system and method for a constructing vector databases used for conversion of natural language queries into accurate cyber language queries that are performant on various security logs stored in various data sources. The disclosed method and system construct vector databases for the specific security logs of a user organization and are designed to minimize latency by utilizing low-dimensionality vector databases. Additionally, the disclosed method and system, by building organization-specific vector databases used to identify fields and values of security logs relevant to a natural language query, provide an operable NL2KQL translation functionality for a variety of cyber databases (e.g., Kusto databases) used to store security logs containing a wide variety of database schema or lacking pre-defined schema.

The disclosed method and system improve security operations by bridging the gap between human intent and structured query languages. The disclosed method and system further enable faster, more intuitive data analysis, empowering security teams to detect threats efficiently without requiring deep expertise in various cyber language querys.

The various disclosed embodiments employ Retrieval Augmentation Generation (RAG) techniques to enrich the context of LLM prompts to generate more precise KQL queries from a free text query. The RAG techniques include the generation and use of vector databases that store embeddings of the fields and values of logs as well as the schema of the logs. In the RAG techniques, free text queries are converted into vector embeddings and similarity searches are performed between the free text embeddings and the log embeddings to determine relevant fields and values of logs used to enrich the prompt for an LLM configured to generate cyber language queries. The vector similarity searches as part of a RAG technique, according to various embodiments, achieve low latency by generating and using low-dimensionality vector databases as opposed to complex high-dimensionality vector databases.

With real-time query translation, low-latency responses, and intelligent prompt engineering, the disclosed NL2KQL solution allows for accurate, accessible, and effective cybersecurity analytics.

FIG. 1 is a network diagram 100 utilized to describe the various disclosed embodiments. In the example network diagram 100, a user device 120; an AI system 130; a variety of vector databases, including field descriptions vector database 140 and a values vector database 150; a schemas database 160; ground-truth NLQ-KQL pairs 170; and a plurality of data sources 180-1 through 180-N (hereinafter referred to individually as a data source 180 and collectively as data sources 180, merely for simplicity purposes) communicate via a network 110. The network 110 may be but is not limited to, a wireless, cellular, or wired network, a local area network (LAN), a wide area network (WAN), a metro area network (MAN), the Internet, the World Wide Web (WWW), similar networks, and any combination thereof.

The databases (including field descriptions vector database 140, values vector database 150, schemas database 160, and ground-truth NLQ-KQL pairs 170) may reside in the same or different physical locations, including on-premises infrastructure, cloud environments (public, private, or hybrid), or a combination thereof. Databases may be implemented as physical, virtualized, or logical entities. In some embodiments, they may be hosted on dedicated hardware; in others, they may be distributed across virtual machines, containers, or cloud-native services. Logical databases may span multiple physical resources, with the underlying infrastructure abstracted by orchestration or virtualization layers. The architecture may include centralized or distributed configurations, and databases may be relational, non-relational (e.g., NoSQL), graph-based, or otherwise structured to meet system requirements. Multiple database types and instances may be used concurrently, supporting various use cases and scalability needs.

The user device (UD) 120 may be but is not limited to, a personal computer, a laptop, a tablet computer, a smartphone, a wearable computing device, or any other device capable of receiving and displaying notifications. A user operating a user device 120 can submit a natural language query to the AI system 130.

Data sources 180 are configured to store logs from various sources like firewalls, servers, applications, and network devices in an organization protected by AI system 130. Data sources 180 are further configured to store or provide detailed reports and data for forensic analysis and/or alerts on cyber incidents. A data source 180 may include but is not limited to, SIEM tools, data lakes, data storage devices, and the like. Examples for data sources 180 include SIEM tools, such as Splunk® Enterprise Security, ArcSight by Micro Focus, LogRhythm, AlienVault, Microsoft® Sentinel, and the like.

A data source 180 may be realized as a data lake is a centralized repository for storing structured and unstructured data at any scale. Unlike traditional databases that store data in structured formats, a data lake can store raw data, which can be processed later according to different needs. The data stored in a data lake may include logs, incidents, and the like. A data source 180 may be a storage, such as a database including structured data, a cloud storage, and the like. Each data source of the data sources 180 may be provided by different vendors and, as such, may store different types of data in different formats.

AI system 130 includes an AI embedding system and an NLQ-KQL pairs system, both discussed in more detail hereinbelow. AI system 130 is configured to receive data from data sources 180. With the received data, AI system 130 is configured to generate descriptions of each field observed in the logs and to convert the field descriptions into embeddings using a text embedding model (discussed in more detail below). AI system 130 is configured to store the embeddings of the field descriptions in a field descriptions vector database 140. Additionally, AI system 130 is configured to extract relevant values from each of the fields of the logs and to store corresponding text embeddings of the values in the values vector database 150.

In an embodiment, AI system 130 generates descriptions of each field using an AI-based search engine, such as, but not limited to, Tavily AI®. AI system 130 generates descriptions of the fields by using the AI-based search engine to gather relevant information on the fields from any official documentation available and other data sources, such as, but not limited to, web-based sources, APIs, or internal knowledge bases that provide insights about the field. In an embodiment, the AI-based search engine is applied to generate descriptions of fields of data by leveraging natural language understanding and content synthesis capabilities to interpret field names, infer semantic meaning, and produce contextually appropriate textual explanations. When provided with a field name, the system utilizes semantic parsing to analyze the linguistic structure of the field label, map the linguistic structure to known ontologies, and retrieve domain-relevant information from structured and unstructured sources.

The field descriptions vector database 140 and the values vector database 150 are low-dimensionality vector databases, thereby decreasing the latency of similarity searches performed using either vector database. In an embodiment, AI system 130 embeds natural language queries and performs similarity searches between the natural language embeddings and embeddings related to the fields and values of the logs.

AI system 130 generates a schema of the unstructured data of the logs and stores the generated schema in schema database 160. In an embodiment, the schema is generated by analyzing the data structures and data types within JavaScript® Object Notation (JSON) data and merging observations regarding the analyzed data structures and data types into a generalized schema. The schema is then updated recursively to reflect new fields and data types based on new data in the logs. This analysis and merging is performed using, for example, genson-rs, which is a high-performance library designed for generating a schema from JSON data, such as security logs.

Ground-truth NLQ-KQL pairs 170 are generated and validated by an NLQ-KQL pairs system as discussed in more detail hereinbelow. As users often repeat similar queries with slight modifications, generating and validating past ground-truth pairs of NLQ queries and KQL queries allows for referencing the ground-truth NLQ-KQL pairs 170 to improve the accuracy of similarity searches and the outputted KQL queries, according to various embodiments. NLQ-KQL pairs system is discussed in more detail hereinbelow.

An AI-based query generation system (discussed in more detail with respect to FIG. 2) may utilize a Large Language Model to generate a KQL query based on the NLQ inputted to the AI-based query generation system. AI-based KQL generation system may also validate the syntax of the cyber language query outputted by the LLM.

It should be noted that AI system 130 can be deployed either in the cloud computing environment or on-premises, depending on the organization's needs, resources, and preferences. The cloud computing environment can be a public, private, or hybrid cloud. Examples of public cloud computing environments include Amazon® Web Services (AWS), Microsoft® Azure, or Google® Cloud Platform (GCP), which offer shared infrastructure managed by the cloud provider, providing scalability, flexibility, and reduced infrastructure management. On-premises deployment involves hosting AI system 130 on the organization's servers and infrastructure, giving the organization complete control over the environment but also requiring more management and maintenance effort. This option is often chosen for systems with strict security or compliance requirements.

It should be understood that the embodiments described herein are merely exemplary and not intended to be limiting. The arrangement illustrated in FIG. 1 is provided for illustrative purposes only and does not restrict the scope of the disclosed embodiments. Various modifications, adaptations, and alternative configurations may be implemented without departing from the spirit and scope of the disclosed embodiments.

Figure 2:
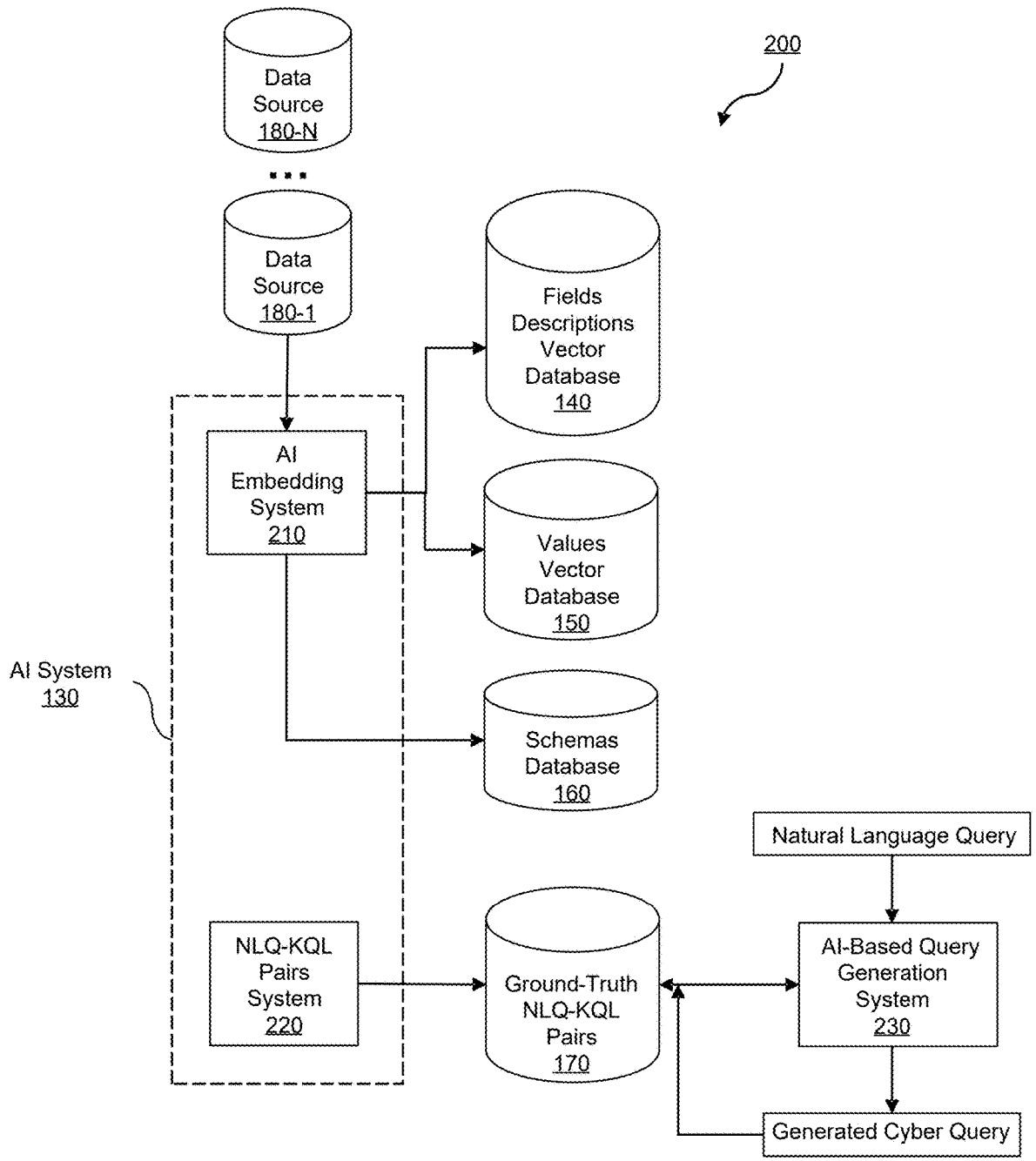
FIG. 2 is an example flow diagram for constructing vector databases used for converting natural language queries to cyber language queries according to an embodiment.

FIG. 2 is an example flow diagram 200 for constructing vector databases used for converting natural language queries to cyber language queries according to an embodiment.

Security logs are received from data sources 180 by AI system 130. AI system 130 includes AI embedding system 210 and an NLQ-KQL pairs system 220. AI embedding system 210 is configured to embed, as field vectors, natural language descriptions of the security logs in field descriptions vector database 140. Additionally, AI embedding system 210 is configured to embed, as value vectors, values of the fields of the security logs in values vector database 150. As explained in greater detail hereinbelow, field vectors are embedded for the later execution of a field vector similarity search between a feature vector representing a natural language query (NLQ) and each embedded field vector to identify fields that are relevant to the NLQ. Additionally, as explained in greater detail hereinbelow, value vectors are embedded for the later execution of a value vector similarity search between a value vector representing a NLQ and each embedded value vector to compute values that are relevant to the NLQ and the fields identified as relevant as a result of the field vector similarity search.

The field descriptions vector database 140 stores vector embeddings of descriptions of fields that are valid in a KQL query. Examples of such fields include, but are not limited to, "EventID", "DestinationIPType", and "eventName". Each field is paired with a textual description, which is encoded into a low-dimensionality embedding vector. The textual description is a generalized, semantically meaningful description. Storing such textual embeddings enables similar fields that have different names across different data sources to have the same description. For example, similar fields may have different field names such as "TargetUsername" and "UserPrincipalName" but the generalized textual description is, for example, "The identity of the user who initiated the action." Storing the embeddings of the generalized description of the fields in the field descriptions vector database 140 enables vector semantic similarity searches with embeddings of natural language descriptions of fields.

The values vector database 150 stores vector embeddings of values that reflect actual values in fields of the logs from a data source. As values within structured fields often exhibit syntactic variation despite representing the same underlying entity, the syntactically different values are embedded in a multi-dimensional feature space where value embeddings neighbor semantically similar value embeddings. For example, the name of an individual may appear as "Michael Smith" in one data source, "msmith@company.com" in another, and simply "msmith" or "Michael S." in a third. Similarly, an organization may be referred to as "Microsoft Corporation," "MSFT," "microsoft.com," or "MS Corp," depending on the context in which the data is logged. Geographic locations may be written as "United States," "USA," "U.S.," or "America." Role titles such as "System Administrator" might appear as "SysAdmin," "Admin," or "Root User," while authentication outcomes may be recorded as "Success," "Succeeded," "Login OK," or a status code such as "200." Storing embeddings for the syntactically different values that have similar semantic meaning enables vector similarity searches with embeddings of natural language value descriptions.

NLQ-KQL pairs system 220 is configured to generate pairs of NLQs and cyber language queries, as discussed in more detail hereinbelow. The generated pairs are potentially valid matches between NLQs and the cyber language queries. NLQ-KQL pairs system 220 is further configured to validate that the generated cyber language queries are properly matched to the generated NLQs. NLQ-KQL pairs system 220 is further configured to embed vectors representing the pairs in a multi-dimensional feature space (e.g., ground-truth NLQ-KQL pairs 170). Additionally, NLQ-KQL pairs system 220 is configured to generate pairs using a prompt engine and an LLM (as explained in more detail hereinbelow), and NLQ-KQL pairs system 220 is configured to embed the generated pairs using a text embedder (explained in more detail hereinbelow).

AI-based query generation system 230 is configured to receive an NLQ and generate a cyber language query used for querying data sources for cybersecurity analysis, as explained in more detail hereinbelow. AI-based query generation system 230 is configured to generate a query in a cyber language based, in part, on the generated schema, the embedded field vectors, and the embedded value vectors. In some embodiments, a prompt is generated and fed to an LLM. AI-based query generation 230 is configured to execute the LLM. The LLM executes the prompt to convert the NLQ into the cyber language query.

It should be understood that the engines, modules, and components described in reference to FIG. 2 may be implemented in software, firmware, hardware, or any combination thereof. In embodiments where the engines are implemented in software, they may comprise instructions stored on a non-transitory computer-readable medium and executed by one or more processors to perform the described functions. The scope of the disclosed embodiments is not limited to any particular implementation, and various modifications, adaptations, and equivalent arrangements may be made without departing from the disclosed embodiments.

Figure 3:
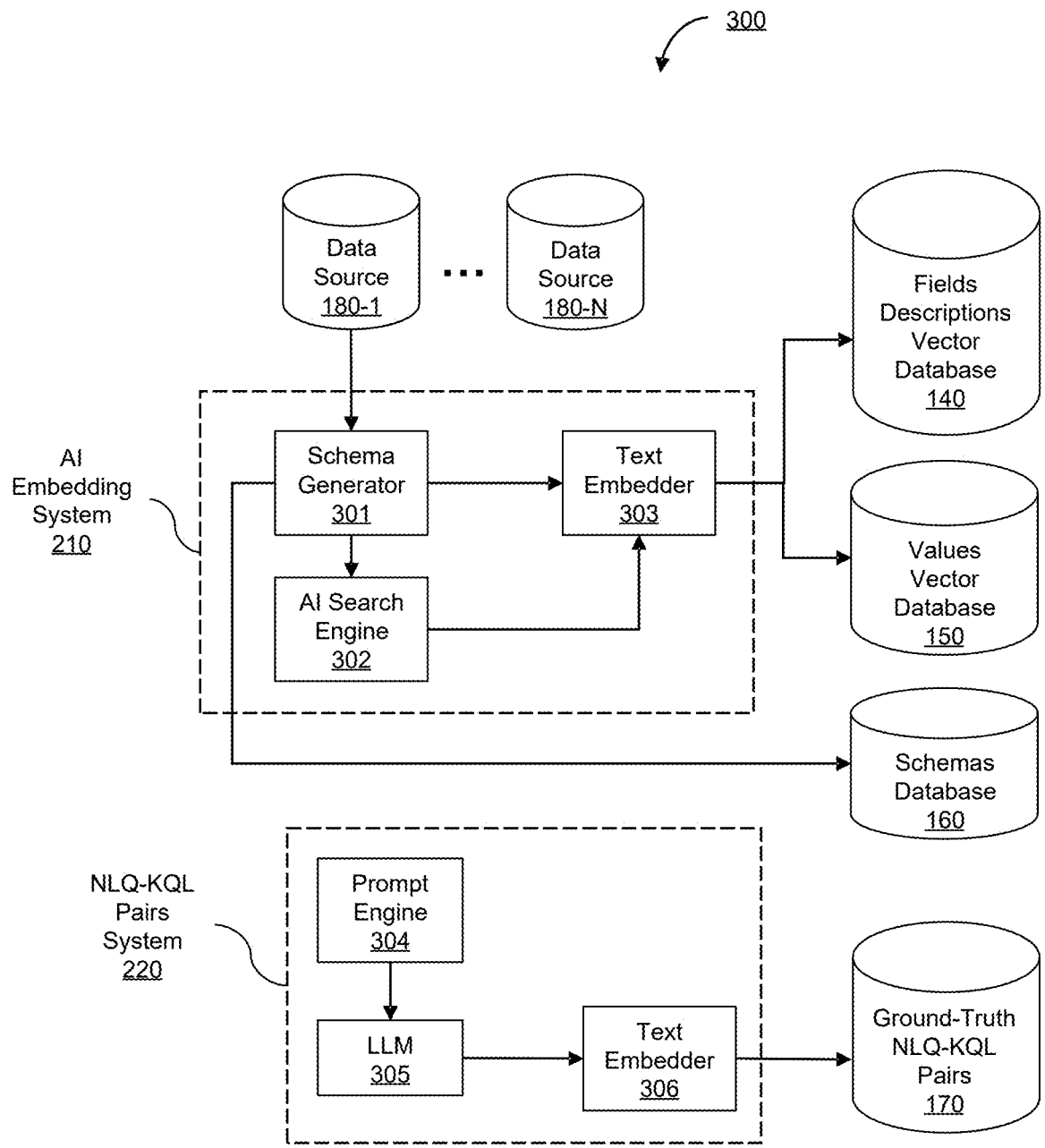
FIG. 3 is an example functional diagram illustrating a process for querying data sources for cybersecurity analysis according to an embodiment.

FIG. 3 is an example functional diagram 300 illustrating a process for querying data sources for cybersecurity analysis according to an embodiment.

AI embedding system 210 is configured to construct vector databases used for generating a cyber language query, for cybersecurity analysis, from a natural language query. AI embedding system 210 includes schema generator 301, AI search engine 302, and text embedder 303.

Schema generator 301 is configured to generate schema of security logs. Generating the schema of security logs is based, in part, on a type of data of the security logs. In some embodiments, the generated schema includes fields of the security logs and values of the fields of the security logs. The generated schema, including fields and values, are sent from schema generator 301 to AI search engine 302.

AI search engine 302 is configured to generate descriptions of each field. In some embodiments, AI-based search engine is configured to gather relevant information on the fields from any official documentation available and other data sources, such as, but not limited to, web-based sources, APIs, or internal knowledge bases that provide insights about the field. In an embodiment, the AI-based search engine is applied to generate descriptions of fields of data by leveraging natural language understanding and content synthesis capabilities to interpret field names, infer semantic meaning, and produce contextually appropriate textual explanations. When provided with a field name, the system utilizes semantic parsing to analyze the linguistic structure of the field label, map the linguistic structure to known ontologies, and retrieve domain-relevant information from structured and unstructured sources.

Text embedder 303 is configured to embed field vectors. The field vectors embedded by the text embedder 303 are vector representations of natural language descriptions of each respective field. Additionally, text embedder 303 is further configured to embed value vectors. The value vectors embedded by the text embedder 303 are vector representations of natural language descriptions of each value in each respective field;

NLQ-KQL pairs system 220 is configured to generate pairs of NLQs and cyber language queries. The generated pairs are potentially valid matches between NLQs and the cyber language queries. NLQ-KQL pairs system 220 is further configured to validate that the generated cyber language queries are properly matched to the generated NLQs. NLQ-KQL pairs system 220 is further configured to embed vectors representing the pairs in a multi-dimensional feature space (e.g., ground-truth NLQ-KQL pairs 170). Additionally, NLQ-KQL pairs system 220 includes prompt engine 304, LLM 305 and text embedder 306.

Prompt engine 304 is configured to generate a prompt including at least a prompt template, where the prompt is configured to be executed by an LLM. The generated prompt is configured to be sent from prompt engine 304 to LLM 305. LLM 305 is configured to execute the prompt to generate testing queries in a cyber language. LLM 305 is then configured to send the generated testing queries to the prompt engine 304. Upon receiving the generated test queries, prompt engine 304 generates a prompt based, in part, on the generated test queries that, when sent to and executed by LLM 305 is configured to produce natural language queries that semantically match the generated testing queries.

In some embodiments, prompt engine 304 is configured to generate a prompt including various natural language queries for various target data sources. The generated prompt, when executed by LLM 305, produces cyber language queries from the various natural language queries.

According to the above embodiments, the generated pairs of NLQs and queries are validated (e.g., by NLQ-KQL pairs system 220). For example, the generated queries in a cyber language are executed on various data sources to confirm syntactic and semantic validity. Mismatches in pairs and the like are recorded and sent to prompt engine 304 to refine the generated prompts for LLM 305.

Text embedder 306 is configured to embed vector representations of the validated pairs of NLQs and cyber language queries (e.g., in ground-truth NLQ-KQL pairs 170).

It should be understood that the engines, modules, and components described in reference to FIG. 3 may be implemented in software, firmware, hardware, or any combination thereof. In embodiments where the engines are implemented in software, they may comprise instructions stored on a non-transitory computer-readable medium and executed by one or more processors to perform the described functions. The scope of the disclosed embodiments is not limited to any particular implementation, and various modifications, adaptations, and equivalent arrangements may be made without departing from the disclosed embodiments.

FIG. 4 is an example flowchart 400 of a process for querying data sources for cybersecurity analysis according to an embodiment.

At S410, security logs from at least one data source is retrieved. In an embodiment, data sources are data sources 180, FIG. 1. In some embodiments, the security logs are unstructured and lack a pre-defined schema. In some embodiments, security logs retrieved from one data source have a schema that is different than the schema of security logs retrieved from another data source.

At S420, schema of the security logs is generated. In an embodiment, schema of the security logs is generated by a schema generator (e.g., schema generator 301, FIG. 3). In some embodiments, schema of the security logs is generated based on at least a type of data of the security logs. In an embodiment, the data of the security logs is JavaScript Objection Notation (JSON) data. According to this embodiment, the generated schema is JSON schema from at least one JSON object in the security logs. In some embodiments, the generated schema includes fields of the security logs as well as values of the fields of the security logs.

In some embodiments, the generated schema is refined. Refining the generated schema of the security logs is based on the identified fields and computed values (as discussed in greater detail below). In an embodiment, refining the generated schema includes narrowing the schema to the most pertinent elements of the schema based on the identified fields and computed values.

At S430, field vectors are embedded. Each field vector is a vector representation of a natural language description of each field of the security logs. In an embodiment, natural language descriptions of the received fields of security logs are generated by an AI search engine (e.g., AI search engine 302, FIG. 3). AI search engine is configured to gather relevant information on the fields from official documentation and other available data sources to generate the natural language descriptions. In some embodiments, field vectors are embedded by a text embedder (e.g., text embedder 303, FIG. 3).

In some embodiments, field vectors are embedded for the later execution of a field vector similarity search between a feature vector representing a natural language query (NLQ) and each embedded field vector to identify fields that are relevant to the NLQ. According to this embodiment, the field vector similarity search includes comparing a feature vector representing the NLQ and each embedded field vector. The comparison is performed using a semantic distance metric including, but not limited to, cosine similarity, Euclidean distance, and the like. The field vector similarity search further includes identifying at least one field whose representative embedded field vector is below a semantic distance threshold from the feature vector representing the NLQ. In some embodiments, the field vector similarity search includes validating the identified at least one field against ground-truth pairs of natural language field descriptions and fields searchable in the cyber language for at least one target data source.

At S440, value vectors are embedded. A value vector is a vector representation of a natural language description of each value in each respective field. In some embodiments, field vectors are embedded by a text embedder (e.g., text embedder 303, FIG. 3).

In some embodiments, value vectors are embedded for the later execution of a value vector similarity search between a value vector representing a natural language query (NLQ) and each embedded value vector to compute values that are relevant to the NLQ and the fields identified as relevant as a result of the field vector similarity search. According to this embodiment, the value vector similarity search includes comparing a feature vector representing the NLQ and each embedded value vector. The comparison is performed using a semantic distance metric including, but not limited to, cosine similarity, Euclidean distance, and the like. The value vector similarity search further includes identifying at least one value whose representative embedded value vector is below a semantic distance threshold from the feature vector representing the NLQ. In some embodiments, the value vector similarity search includes validating the at least one value against ground-truth pairs of natural language value descriptions and actual values in the at least one target data source.

At S450, a cyber language query is generated for execution on at least one target data source. In an embodiment, the cyber language query is a read-only request to process data stored hierarchically in databases, tables, and columns. In some embodiments, the cyber language query is Kusto Query Language (KQL). According to various disclosed embodiments, a cyber language is a specialized query language designed to extract, analyze, and correlate security-related data from logs and telemetry sources for purposes such as threat detection, incident investigation, and operational monitoring. In some embodiments, the cyber language query is generated using an AI-based query generation system (e.g. AI-based query generation system 230, FIG. 2).

In an embodiment, the generated cyber language query is based, in part, on the generated schema, the embedded field vectors, and the embedded value vectors. According to this embodiment, fields that are relevant to a NLQ are identified based on a field vector similarity search using the embedded field vectors, as explained above. Additionally, values for the identified fields are computed based on actual values that are relevant to the identified fields and the NLQ based on a value vector similarity search using the embedded value vectors, as explained above. Further, the generated schema is refined based on the identified fields and the computed values.

In some embodiments, a prompt for a LLM is generated based, in part, on the refined schema, where the LLM is executed by an AI-based query generation system. According to this embodiment, the generated prompt is then fed to the LLM, where the LLM executes the prompt using the AI-based query generation system, to convert the NLQ into the cyber language query. In some embodiments, the syntactical correctness of the generated query is validated (e.g., by the AI-based query generation system).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
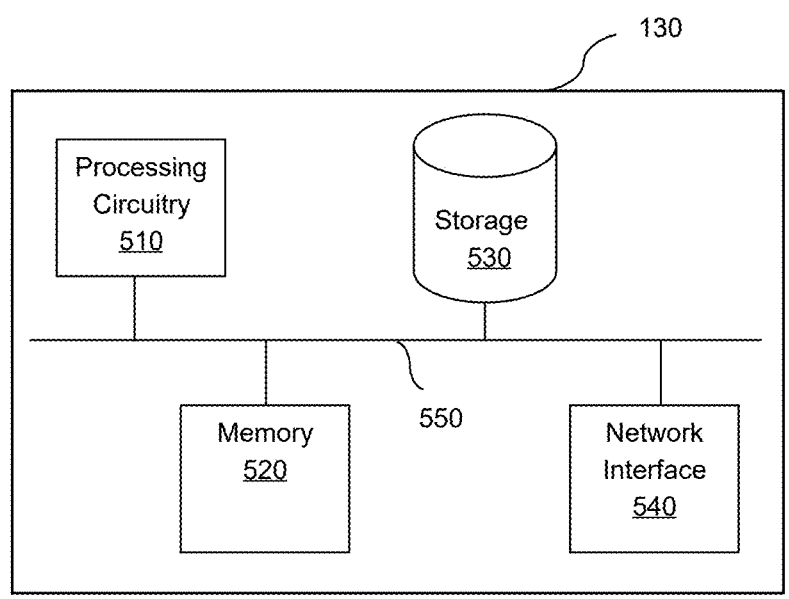
FIG. 5 is an example schematic diagram of an AI system according to an embodiment.

FIG. 5 is an example schematic diagram of an AI system 130 according to an embodiment. The AI system 130 is a compute device that includes, according to an embodiment, a processing circuitry 510 coupled to a memory 520, a storage 530, and a network interface 540. In an embodiment, the components of the AI system 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In at least some embodiments, the processing circuitry 510 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 510 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 510 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 510 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 510 may include a number of CPU cores which is equal to or greater than the number of GPUs in order to facilitate or otherwise support parallel processing via multiple GPUs.

In an embodiment, the memory 520 is a volatile memory (e.g., random access memory, etc.), a non-volatile memory (e.g., read-only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the AI system 130 with communication with, for example, the user device 120, the field descriptions vector database 140, the values vector database 150, schemas database 160, ground-truth NLQ-KQL pairs 170, data sources 180, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or certain devices and/or a combination of devices. The application program may be uploaded to, and executed by, a machine comprising any suitable architecture. Preferably, the machine is implemented on a computer platform having hardware such as one or more processing units (PUs), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for querying data sources for cybersecurity analysis, comprising:
   receiving, by a device, security logs from at least one data source, wherein the security logs lack pre-defined schema;
   generating, using an artificial intelligence (AI) embedding system, a schema of the security logs based on at least a type of data of the security logs, wherein the generated schema includes fields of the security logs and values of the fields;
   embedding, using the AI embedding system, field vectors, wherein each field vector is a vector representation of a value of each respective field;
   embedding, using the AI embedding system, value vectors, wherein each value vector is a vector representation of a natural language description of each value in each respective field;
   generating a query in a cyber language query, using an AI system; and
   executing the generated query on at least one target data source based, in part, on the generated schema, the embedded field vectors, and the embedded value vectors.

2. The method of claim 1, further comprising:
   generating pairs of NLQs and cyber language queries, wherein the pairs are potentially valid matches between NLQs and the cyber language queries;
   validating that the generated cyber language queries are properly matched to the generated NLQs; and
   embedding vectors of each of the pairs.

3. The method of claim 1, wherein generating the cyber language query, using an AI system further comprises:
   identifying fields that are relevant to a natural language query (NLQ) based on a field vector similarity search using the embedded field vectors;
   computing values for the identified fields based on actual values that are relevant to the identified fields and the NLQ based on a value vector similarity search using the embedded value vectors;
   refining the generated schema based on the identified fields and the computed values;
   generating, based on at least the refined schema, a prompt for a Large Language Model (LLM), wherein the LLM is executed by an AI-based query generation system; and
   feeding the prompt to the LLM, wherein the LLM executes the prompt using the AI-based query generation system, to convert the NLQ into the cyber language query.

4. The method of claim 3, wherein the field vector similarity search further comprises:
   comparing, using a semantic distance metric, a feature vector representing the NLQ and each embedded field vector;
   identifying at least one field for which the embedded field vector is below a semantic distance threshold from the feature vector representing the NLQ; and
   validating the identified at least one field against ground-truth pairs of natural language field descriptions and fields searchable in the cyber language for at least one target data source.

5. The method of claim 3, wherein the value vector similarity search further comprises:
   comparing, using a semantic distance metric, a feature vector representing the NLQ and each embedded value vector;
   identifying at least one value for which the embedded value vector is below a semantic distance threshold from the value vector representing the NLQ; and
   validating the at least one value against ground-truth pairs of natural language value descriptions and actual values in the at least one target data source.

6. The method of claim 3, wherein refining the schema of the logs based on the identified fields and computed values further comprises:
   narrowing the schema to the most pertinent elements of the schema based on the identified fields and computed values.

7. The method of claim 1, further comprising:
   generating, using the AI embedding system, the natural language descriptions of the received fields, wherein the AI embedding system is configured to gather relevant information on the fields from official documentation and other available data sources to generate the natural language descriptions.

8. The method of claim 1, further comprising:
   validating syntactical correctness of the generated cyber language query.

9. The method of claim 1, wherein the cyber language query is a read-only request to process data stored hierarchically in databases, tables, and columns.

10. The method of claim 1, wherein the cyber language is at least Kusto Query Language.

11. A non-transitory computer-readable medium storing a set of instructions for querying data sources for cybersecurity analysis, the set of instructions comprising:
one or more instructions that, when executed by one or more processors of a device, cause the device to:
receive, by a device, security logs from at least one data source, wherein the security logs lack pre-defined schema;
generate, using an artificial intelligence (AI) embedding system, a schema of the security logs based on at least a type of data of the security logs, wherein the generated schema includes fields of the security logs and values of the fields;
embed, using the AI embedding system, field vectors, wherein each field vector is a vector representation of a value of each respective field;
embed, using the AI embedding system, value vectors, wherein each value vector is a vector representation of a natural language description of each value in each respective field;
generate a query in a cyber language query, using an AI system and
execute the query on at least one target data source based, in part, on the generated schema, the embedded field vectors, and the embedded value vectors.

12. A system for querying data sources for cybersecurity analysis comprising:
one or more processors; and
a memory including instructions configured to:
receive, by a device, security logs from at least one data source, wherein the security logs lack pre-defined schema;
generate, using an artificial intelligence (AI) embedding system, a schema of the security logs based on at least a type of data of the security logs, wherein the generated schema includes fields of the security logs and values of the fields;
embed, using the AI embedding system, field vectors, wherein each field vector is a vector representation of a value of each respective field;
embed, using the AI embedding system, value vectors, wherein each value vector is a vector representation of a natural language description of each value in each respective field; and
generate a query in a cyber language query, using an AI system; and
execute the query on at least one target data source based, in part, on the generated schema, the embedded field vectors, and the embedded value vectors.

13. The system of claim 12, further comprising:
generating pairs of NLQs and cyber language queries, wherein the pairs are potentially valid matches between NLQs and the cyber language queries
validating that the generated cyber language queries are properly matched to the generated NLQs; and
embedding vectors of each of the pairs.

14. The system of claim 12, wherein generating the cyber language query, using an AI system further comprises:
identifying fields that are relevant to a natural language query (NLQ) based on a field vector similarity search using the embedded field vectors
computing values for the identified fields based on actual values that are relevant to the identified fields and the NLQ based on a value vector similarity search using the embedded value vectors
refining the generated schema based on the identified fields and the computed values
generating, based on at least the refined schema, a prompt for a Large Language Model (LLM), wherein the LLM is executed by an AI-based query generation system; and
feeding the prompt to the LLM, wherein the LLM executes the prompt using the AI-based query generation system, to convert the NLQ into the cyber language query.

15. The system of claim 14, wherein the field vector similarity search further comprises:
comparing, using a semantic distance metric, a feature vector representing the NLQ and each embedded field vector
identifying at least one field for which the embedded field vector is below a semantic distance threshold from the feature vector representing the NLQ; and
validating the identified at least one field against ground-truth pairs of natural language field descriptions and fields searchable in the cyber language for at least one target data source.

16. The system of claim 14, wherein the value vector similarity search further comprises:
comparing, using a semantic distance metric, a feature vector representing the NLQ and each embedded value vector
identifying at least one value for which the embedded value vector is below a semantic distance threshold from the value vector representing the NLQ; and
validating the at least one value against ground-truth pairs of natural language value descriptions and actual values in the at least one target data source.

17. The system of claim 14, wherein refining the schema of the logs based on the identified fields and computed values further comprises:
narrowing the schema to the most pertinent elements of the schema based on the identified fields and computed values.

18. The system of claim 12, further comprising:
generating, using the AI embedding system, the natural language descriptions of the received fields, wherein the AI embedding system is configured to gather relevant information on the fields from official documentation and other available data sources to generate the natural language descriptions.

19. The system of claim 12, further comprising:
validating syntactical correctness of the generated cyber language query.

20. The system of claim 12, wherein the cyber language query is a read-only request to process data stored hierarchically in databases, tables, and columns.

21. The system of claim 12, wherein the cyber language is at least Kusto Query Language.

* * * * *